Dec. 27, 1966 S. O. SCHLAF 3,294,281
PACKAGE VENDOR WITH HELIX SHAPED DELIVERY SPINDLE
Filed Dec. 3, 1964 9 Sheets-Sheet 1
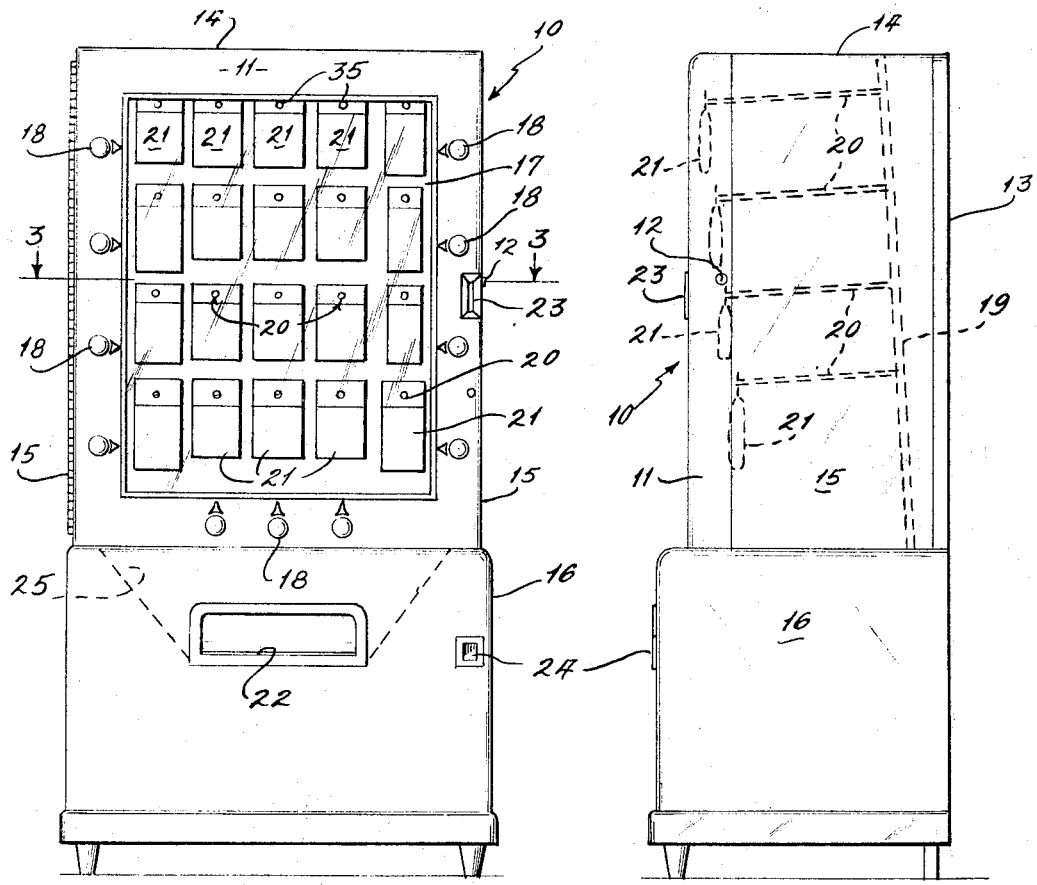
FIG.1  FIG.2
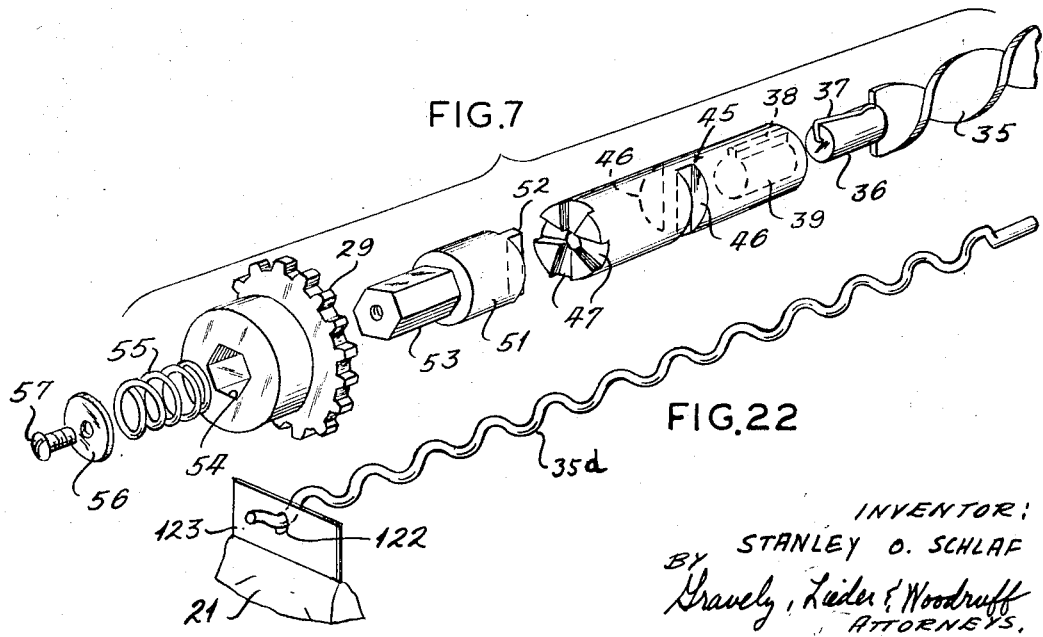
FIG.7
FIG.22
INVENTOR:
STANLEY O. SCHLAF
BY Gravely, Lieder & Woodruff
ATTORNEYS.

Dec. 27, 1966 S. O. SCHLAF 3,294,281
PACKAGE VENDOR WITH HELIX SHAPED DELIVERY SPINDLE
Filed Dec. 3, 1964 9 Sheets-Sheet 2

INVENTOR:
STANLEY O. SCHLAF
BY
Gravely Lieder & Woodruff
ATTORNEYS.

Dec. 27, 1966　　　　S. O. SCHLAF　　　3,294,281
PACKAGE VENDOR WITH HELIX SHAPED DELIVERY SPINDLE
Filed Dec. 3, 1964　　　　　　　　　　　9 Sheets-Sheet 3

INVENTOR:
STANLEY O. SCHLAF
BY Gravely, Lieder & Woodruff
ATTORNEYS.

Dec. 27, 1966 S. O. SCHLAF 3,294,281
PACKAGE VENDOR WITH HELIX SHAPED DELIVERY SPINDLE
Filed Dec. 3, 1964 9 Sheets-Sheet 4

INVENTOR:
STANLEY O. SCHLAF
BY Gravely, Lieder & Woodruff
ATTORNEYS

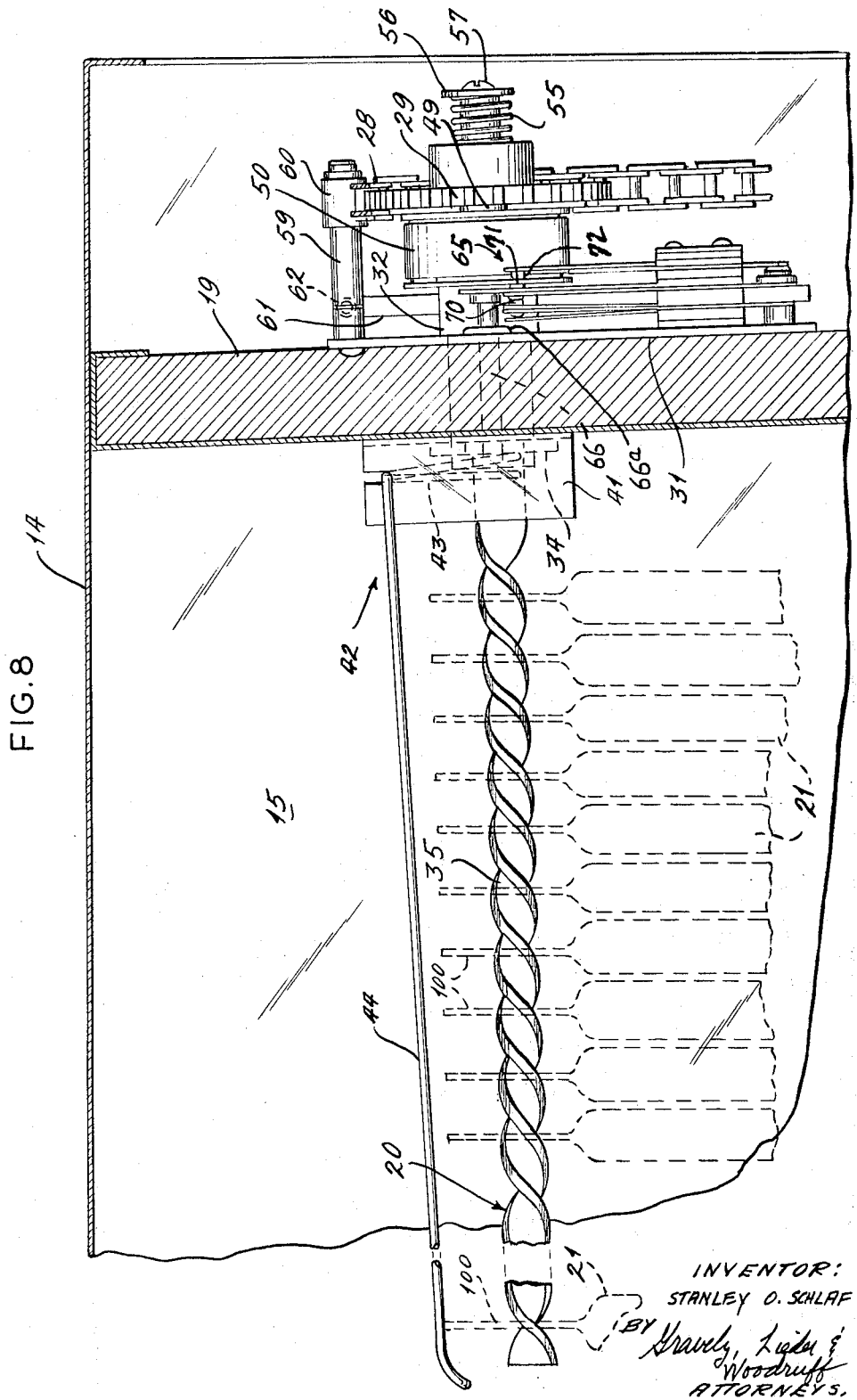

Dec. 27, 1966   S. O. SCHLAF   3,294,281
PACKAGE VENDOR WITH HELIX SHAPED DELIVERY SPINDLE
Filed Dec. 3, 1964   9 Sheets-Sheet 6

INVENTOR:
STANLEY O. SCHLAF
BY Gravely, Lieder & Woodruff
ATTORNEYS.

Dec. 27, 1966  S. O. SCHLAF  3,294,281
PACKAGE VENDOR WITH HELIX SHAPED DELIVERY SPINDLE
Filed Dec. 3, 1964  9 Sheets-Sheet 7

INVENTOR
STANLEY O. SCHLAF
BY Gravely, Lieder & Woodruff
ATTORNEYS.

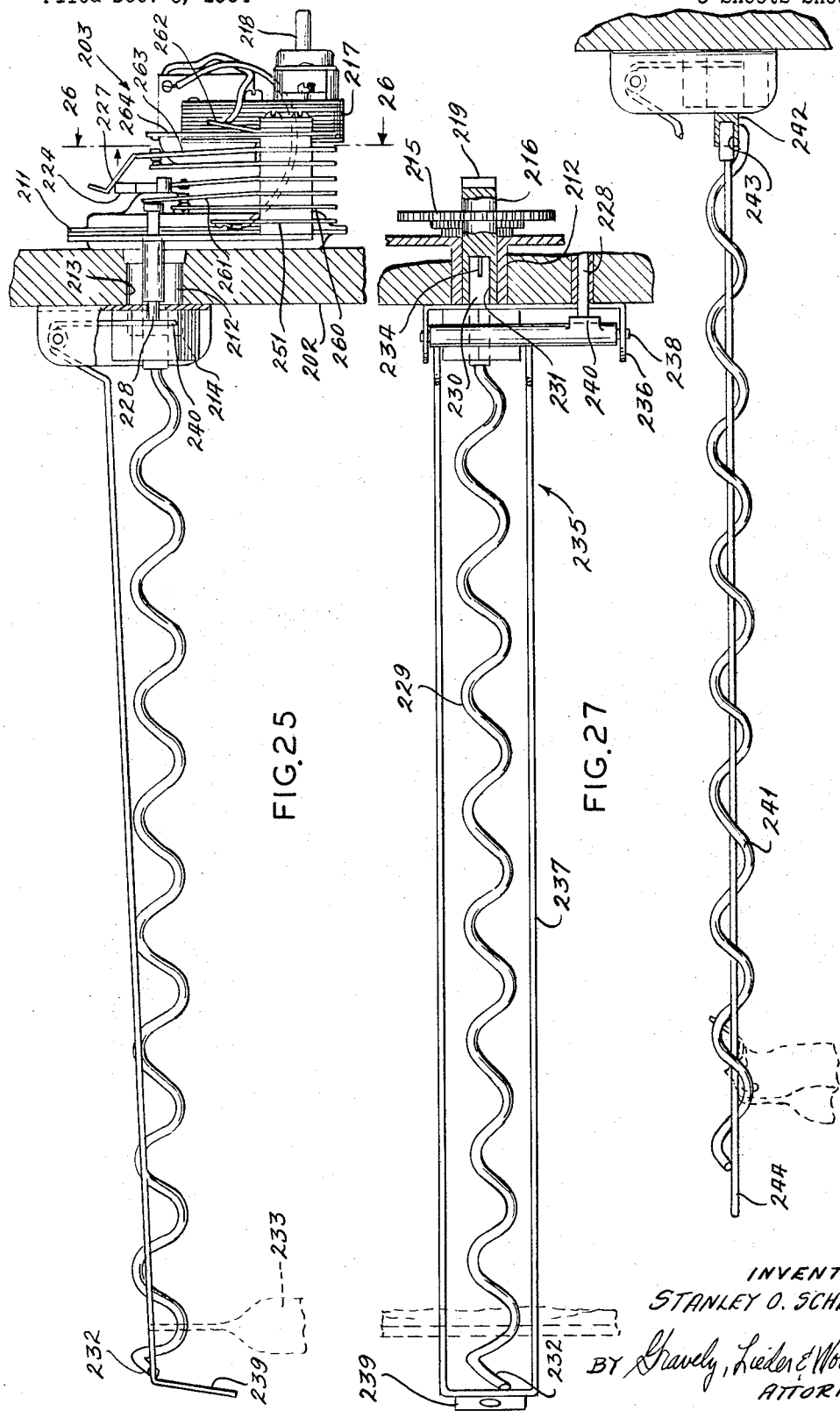

United States Patent Office 3,294,281
Patented Dec. 27, 1966

3,294,281
PACKAGE VENDOR WITH HELIX SHAPED
DELIVERY SPINDLE
Stanley O. Schlaf, Rte. 1, Box 233,
Winfield, Mo. 63389
Filed Dec. 3, 1964, Ser. No. 416,966
20 Claims. (Cl. 221—9)

The present application is a continuation-in-part of my copending application Serial No. 269,320, now abandoned.

The present invention relates to merchandise vending machines and means for adapting merchandise packages for use with said machines.

Specifically, the present invention relates to multiple selection vending machines having spindle delivery means selectively actuated by individual selector means.

One of the principal objects of the present invention is to provide a multiple selection modular vending machine having individually actuated, replaceable, plug-in vend and delivery modules with helix shaped delivery means.

Another principal object of the present invention is to provide a modified multiple selection vending machine wherein the individual delivery mechanisms are of modular construction, easily replaceable, readily adaptable to varying merchandise sizes, and the modified machine utilizes but a single drive mechanism for all of the modules.

Another object of the present invention is to provide a replaceable module for a multiple selection vending machine.

A further object of the present invention is to provide a coin actuated vending machine having a plurality of individual selector means some of which are adapted to actuate in turn more than one dispensing apparatus.

Still another object of the present invention is to provide helix shaped vend rods having security means in combination therewith to prevent removal of merchandise packages from the rods by striking or rocking the vending machine.

A further object of the present invention is to provide a vending machine having individual vend modules with helix shaped dispensing rods and feeler means in combination therewith for disconnecting the vend modules electrically from the remainder of the circuit when the rod is void of merchandise.

A further object of the present invention is to provide a dispensing mechanism for a vending machine which will successively actuate a plurality of individual dispensers as the dispensers become empty of merchandise.

These and other objects and advantages will become apparent hereinafter.

The present invention comprises a merchandise vending apparatus for dispensing tab supported merchandise packages individually from the free ends of screw shaped spindles which form part of replaceable plug-in vend modules. The present invention also comprises the vend modules, security devices, methods and merchandise package constructions hereinafter described and claimed.

In the drawings wherein like numerals refer to like parts wherever they occur:

FIG. 1 is a front elevational view of one embodiment of the present invention,

FIG. 2 is a side elevational view of the invention shown in FIG. 1,

Figures 5, 11:
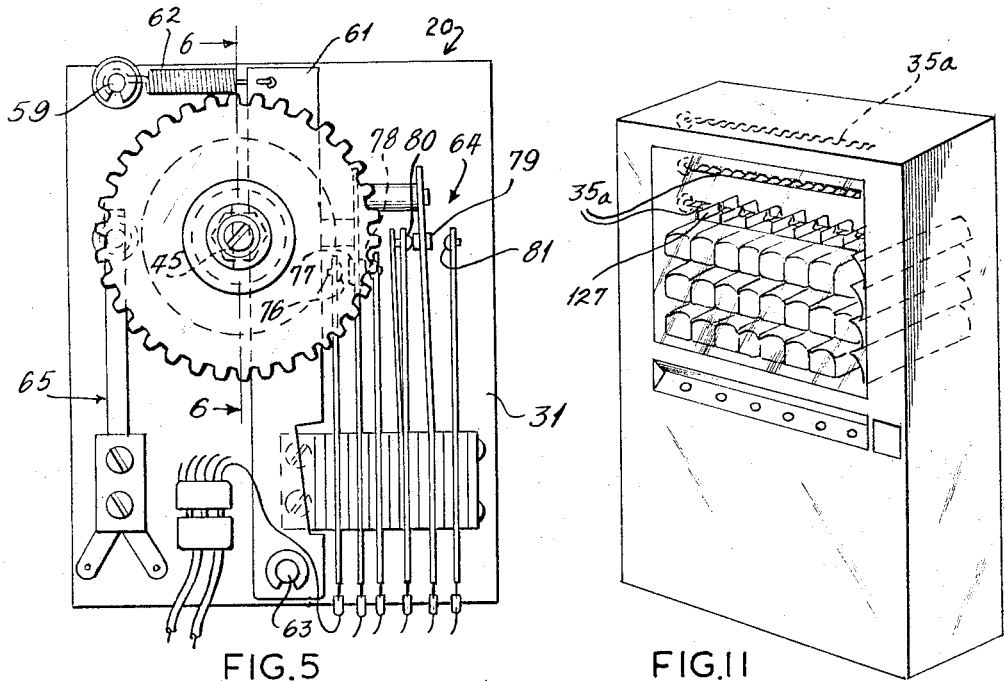
Figure 3:
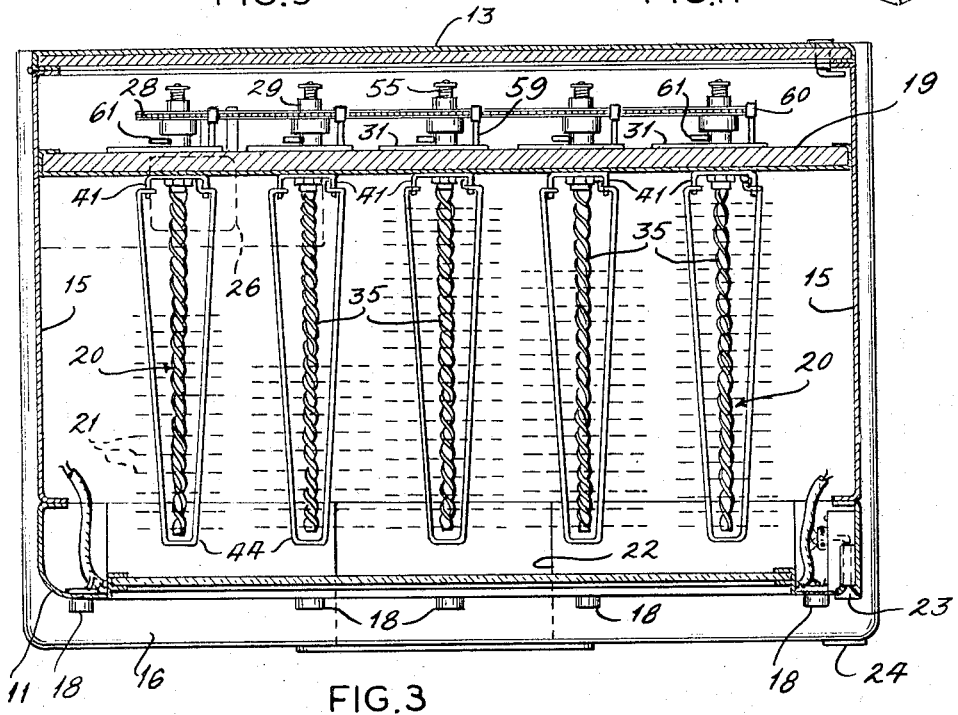
FIG. 3 is a sectional view taken along line 3—3 of FIG. 1.
Figure 4:
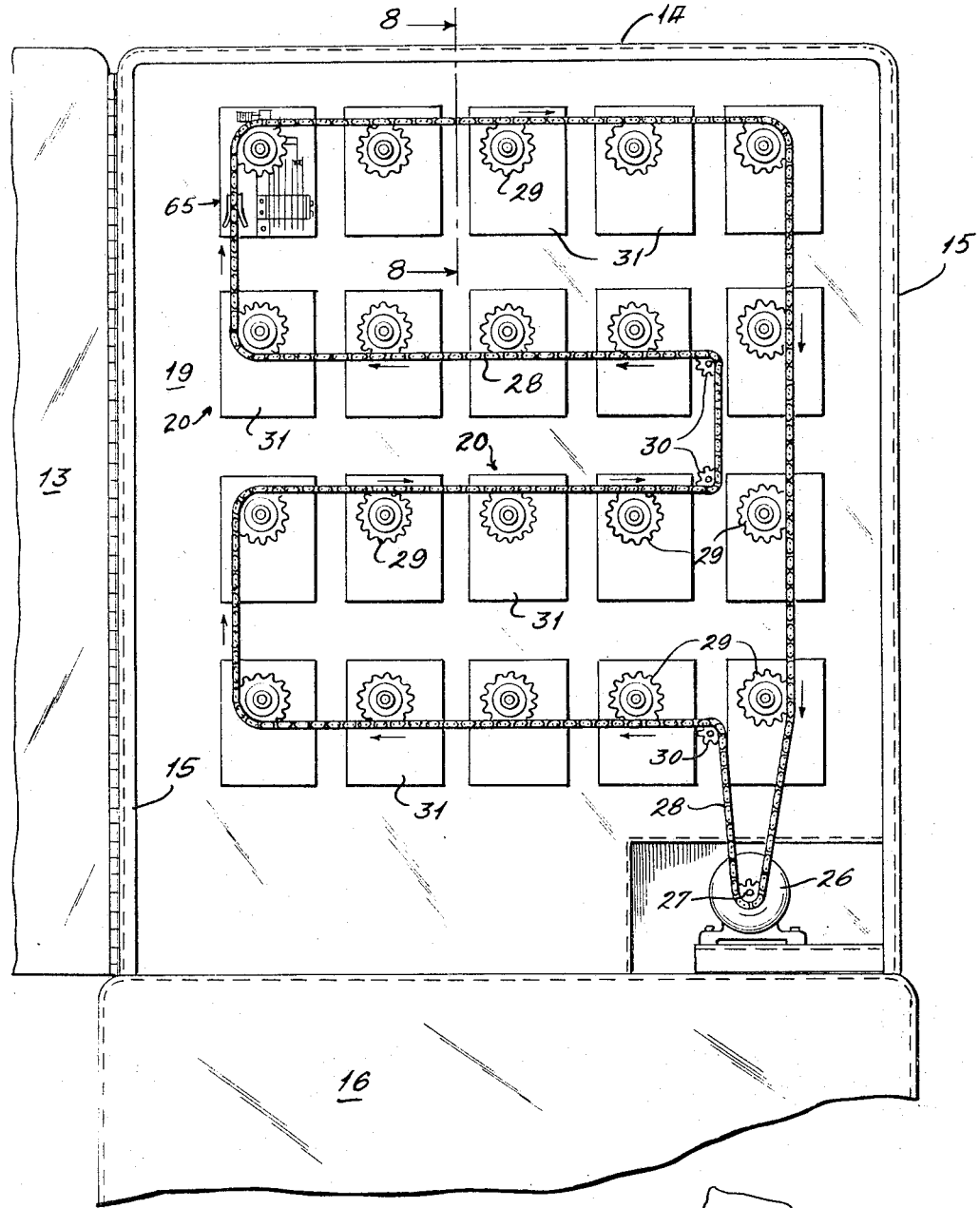
Figure 9:
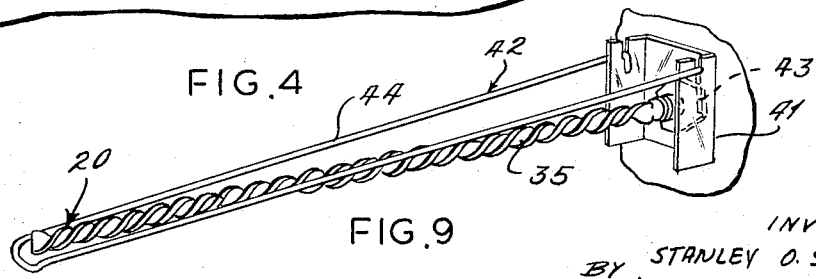
Figure 6:
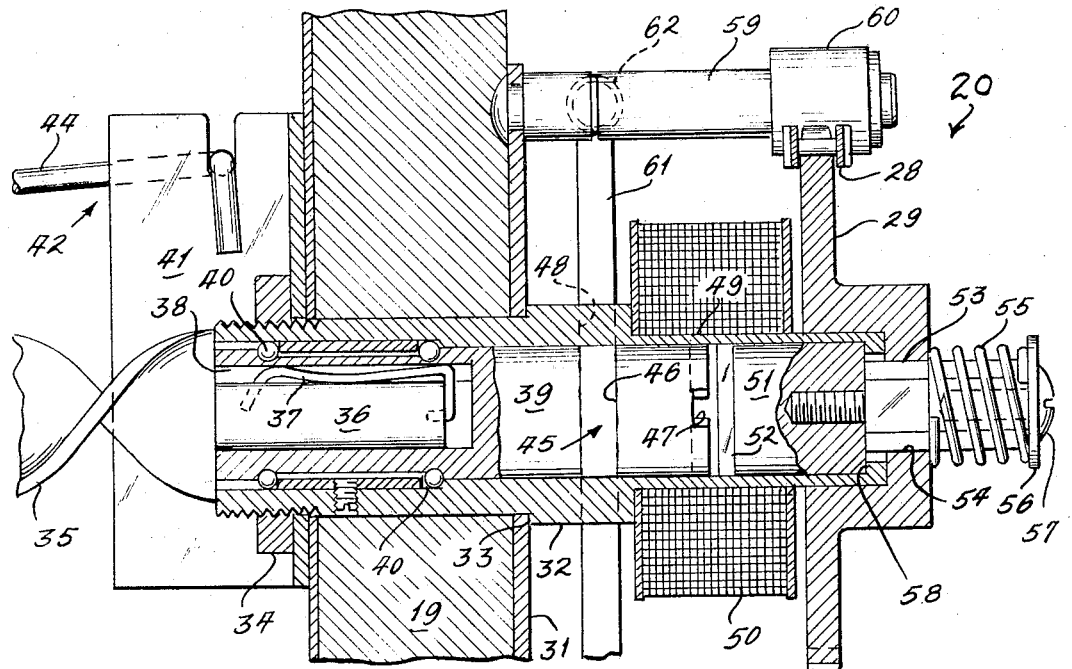
Figure 10:
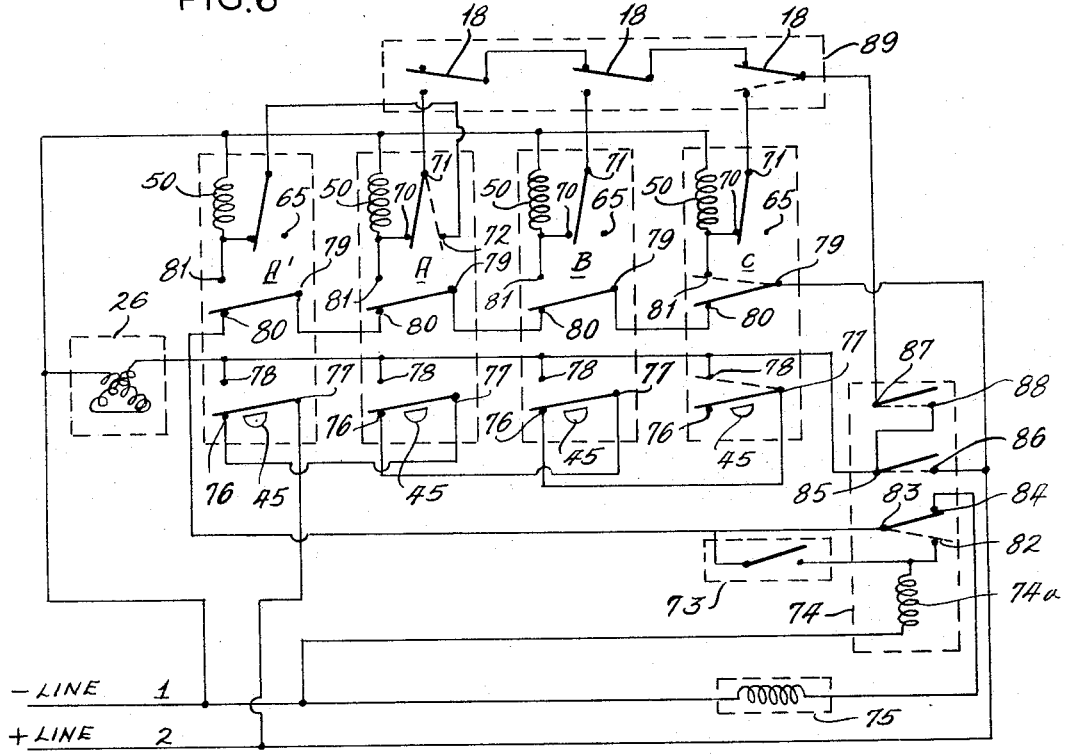
Figure 14:
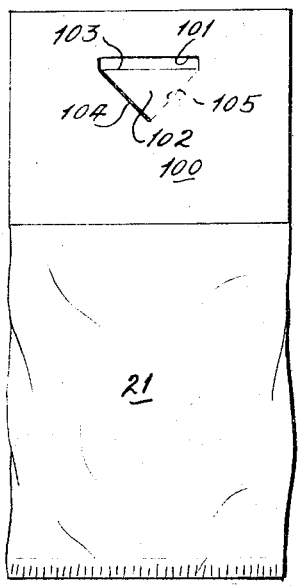
Figure 15:
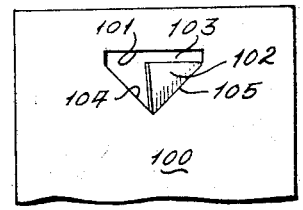
Figure 21:
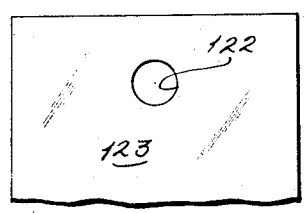
Figure 16:
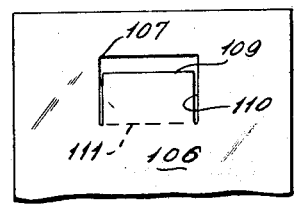
Figure 17:
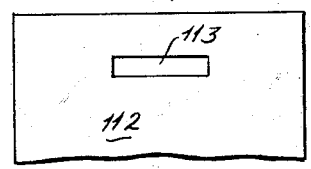
Figure 18:
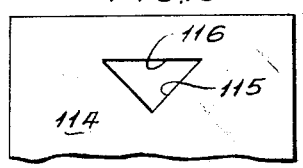
Figure 20:
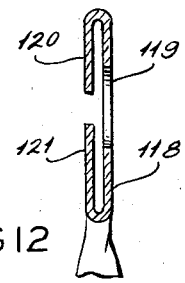
Figure 19:
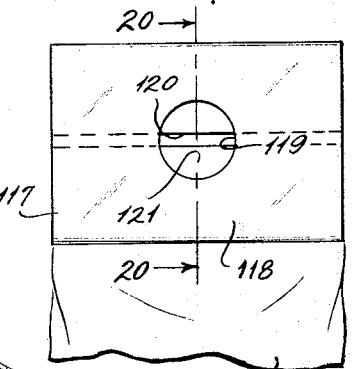
Figure 12:
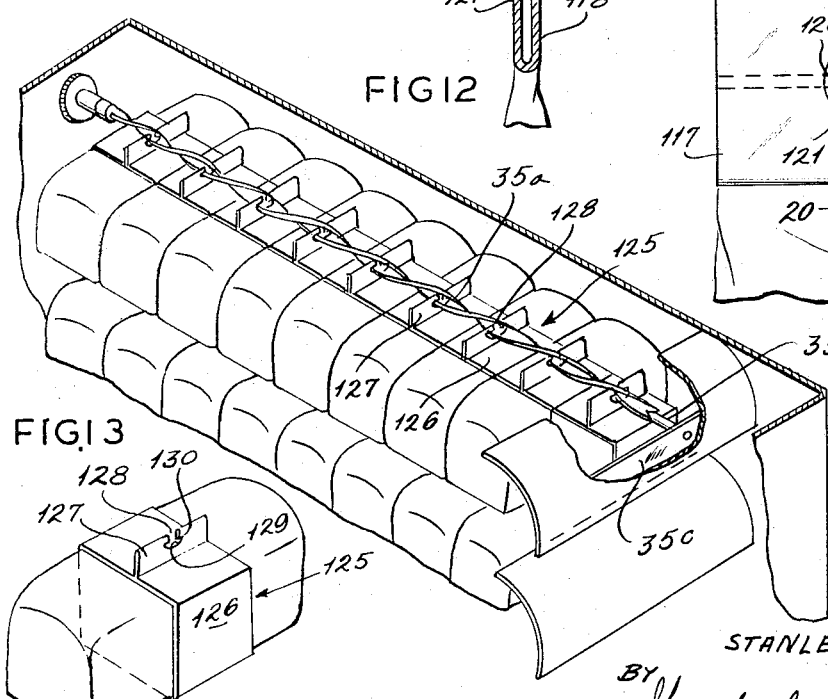
Figure 13:
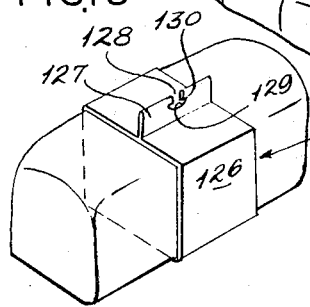
Figures 23, 24:
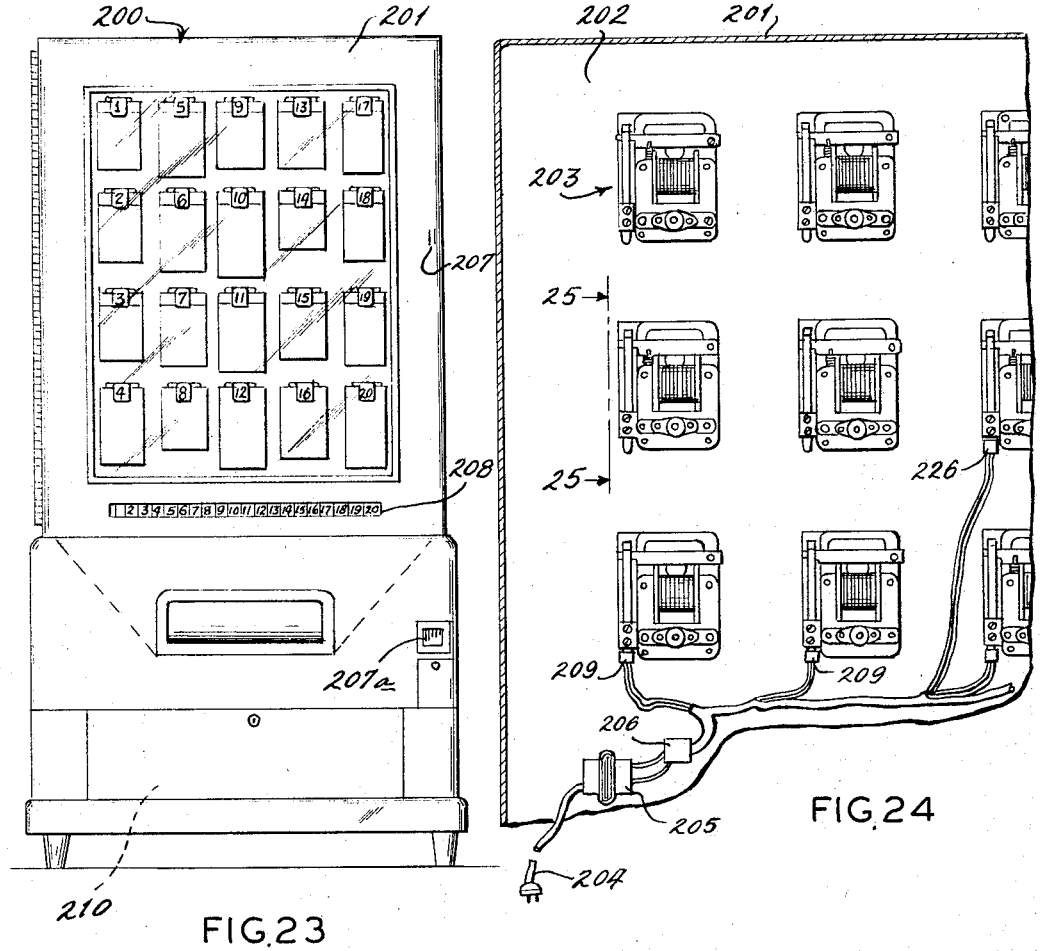
Figure 26:
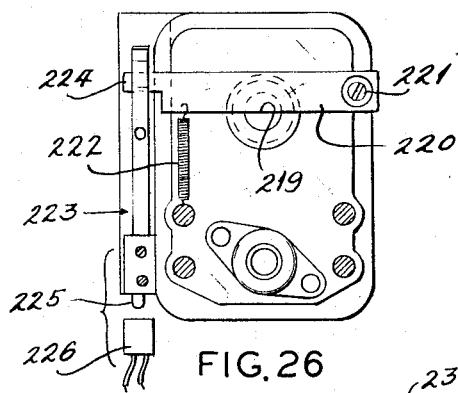
Figure 29:
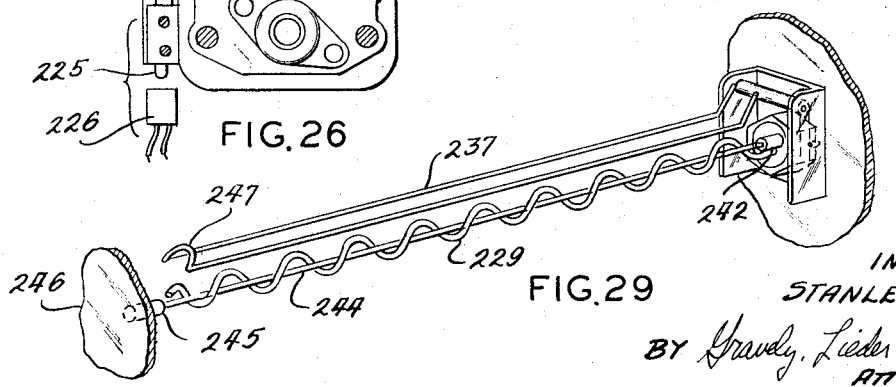
Figure 30:
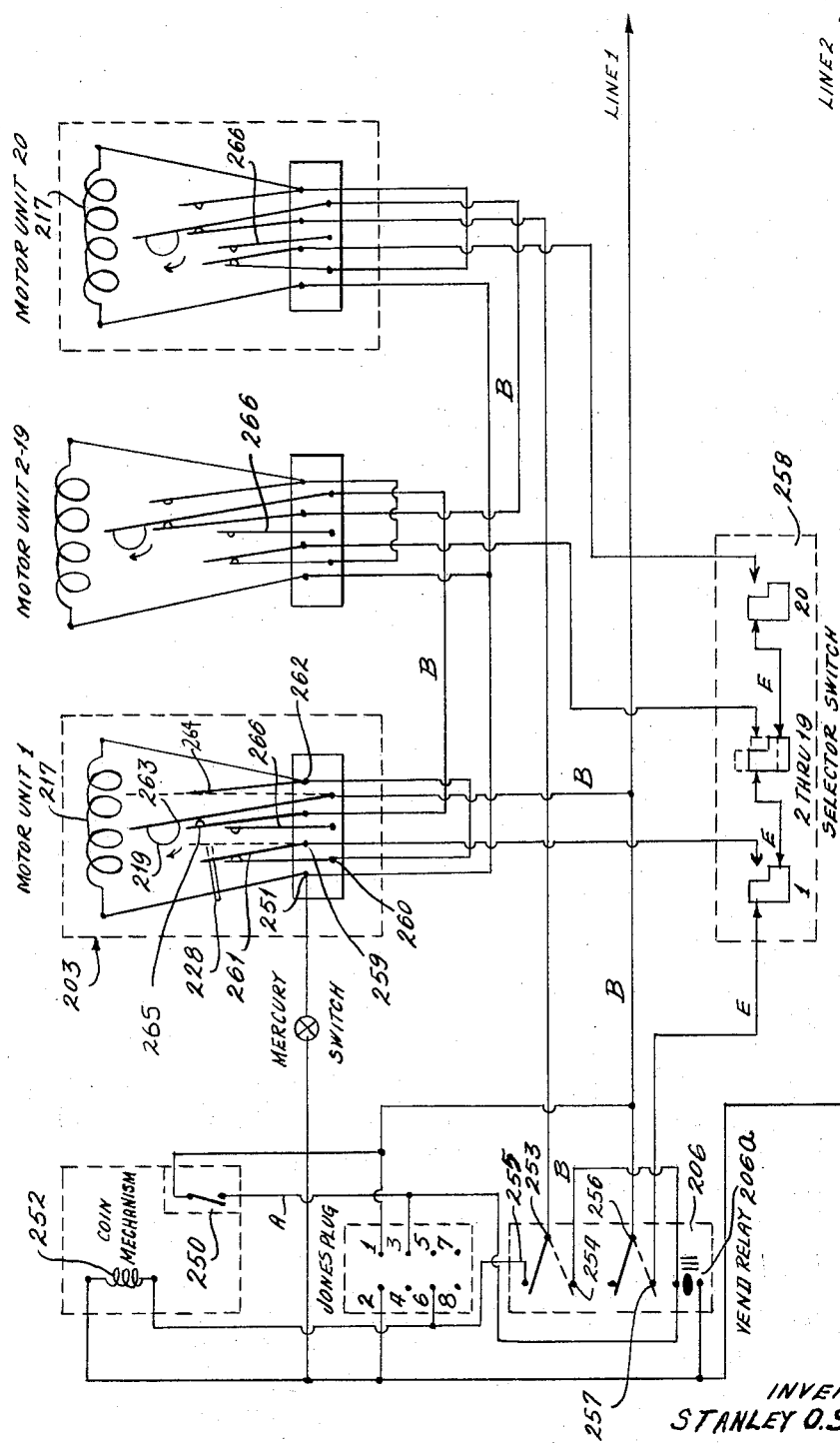

FIG. 4 is an elevational view looking into the back of the cabinet shown in FIG. 1, FIG. 5 is a rear elevational view of an individual dispensing module, FIG. 6 is an enlarged fragmentary sectional view taken along line 6—6 of FIG. 5, FIG. 7 is an exploded perspective view showing the drive mechanism for the individual dispensing modules, FIG. 8 is an enlarged fragmentary sectional view showing an individual dispensing module and a portion of the drive mechanism and indicating the merchandise packages in broken lines, FIG. 9 is a perspective view of an empty dispensing helix and sold out lever, FIG. 10 is a diagrammatic representation of the electrical system for the embodiment shown in FIGS. 1–9, FIG. 11 is a perspective view showing a modification of the present invention adapted to dispense large objects such as loaves of bread, FIG. 12 is a fragmentary partially broken perspective view of the bread vending device shown in FIG. 11 and shows the dispensing arrangement in greater detail, FIG. 13 is a perspective view of a loaf of bread having a vending wrapper thereon, FIG. 14 is a front view of a merchandise package adapted to be vended from the mechanism shown in FIGS. 1–10, FIG. 15 is a view of the tab portion of the package shown in FIG. 14, FIG. 16 is a view of a modified merchandise package tab, FIG. 17 is a fragmentary view of another modification of package tab, FIG. 18 is a fragmentary view of a further modification of package tab, FIG. 19 is a fragmentary view of a package showing another tab modification, FIG. 20 is a sectional view taken along line 20—20 of FIG. 19, FIG. 21 is a fragmentary view of a further modification of package tab, FIG. 22 is a fragmentary view of a twisted wire single lead spindle, FIG. 23 is a front elevational view of a preferred modified vending machine, FIG. 24 is a fragmentary sectional view showing a portion of the support panel of the vendor shown in FIG. 23, FIG. 25 is a fragmentary sectional view taken along line 25—25 of FIG. 24, FIG. 26 is a back elevational view of a vending module taken along line 26—26 of FIG. 25, FIG. 27 is a fragmentary plan view partly in section of the structure shown in FIG. 25, FIG. 28 is a fragmentary view showing a modification of the dispensing helix, FIG. 29 is a fragmentary perspective view showing another modification of the vending helix, and FIG. 30 is a diagrammatic representation of the electric system for the preferred embodiment shown in FIGS. 23–29.

Cabinet

The present invention comprises a vending machine 10 (FIGS. 1 and 2) which includes a hinged front door 11 secured by a lock mechanism 12, a rear door 13, a top wall 14, side walls 15, and a base portion 16. The front door 11 is provided with a clear viewing panel 17. Selector buttons 18 are vertically and horizontally aligned along the edges of the front door 11, and, as will be explained more fully hereinafter, are actuated to dispense the particular merchandise desired.

A main support panel 19 is positioned within the machine 10 and is the background which is visible through the viewing panel 17. The main support panel supports a plurality of dispensing modules 20 (FIGS. 4 and 8) each of which hold a series of merchandise packages 21. The merchandise packages 21 may be food, such as potato chips, peanuts, etc. or other tab supported packages.

The panel 19 is forwardly inclined (as indicated in FIG. 2) so that the merchandise packages 21 have a free path to a dispensing slot 22 and do not strike the packages located beneath as they are dispensed. Other arrangements whereby the upper spindle ends are ahead of those beneath may be used.

A coin insert 23, which leads to a standard slug rejector and coin switch or other coin crediting mechanism for actuating the machine and thence to a coin box (not shown) or a coin return 24, is provided in the front face of the machine 10. The merchandise dispensing slot 22 is positioned in the front of the base section 16 and communicates with the area housing the merchandise packages 21 by means of an inclined chute 25.

The cabinet 10 can be refrigerated or heated, if desired.

*Drive mechanism for embodiment of FIGS. 1–9*

The common drive mechanism (FIG. 4) for the individual dispensing modules 20 comprises a drive means or motor 26 which is mounted to the rear of the main support panel 19 on the base section 16. The output shaft of the drive motor 26 is provided with a drive sprocket 27. The sprocket 27 drives an endless chain 28 which is so positioned as to operatively connect all of the secondary drive sprockets 29 positioned on the back sides of the dispensing modules 20. The chain 28 is positioned by means of idler sprockets 30 so as to drive all of the secondary module drive sprockets 29 in the same direction (indicated by the arrows in FIGS. 4).

*Dispensing modules*

The dispensing means for the merchandise packages 21 are indicated generally by the number 20 (FIGS. 5–9) and are each of modular construction so that they may be replaced individually if repair is needed, and the entire vending machine does not need to be taken out of operation. This is an important operating and repair advancement, since the modules can be replaced by an ordinary mechanic, whereas presently a specially skilled machine repairman is necessary to make even minor repairs on the complicated vending machines now in service.

Each of the modules 20 is removably positioned on the support panel 19 and comprises a base member 31 (FIG. 6) positioned at the rear of the support panel 19, a hollow hub 32 which is provided with a shoulder 33 adjacent to the base member 31 and which passes through the base member 31 and the main support panel 19, and a retaining nut 34 threaded to the front end of the hub 32 at the front side of the support panel 19. The modules 20 also include an auger-type dispensing helix or screw spindle 35 which protrudes outwardly from the support member 19 and is inclined toward the floor of the vending machine 10. The helix 35 is provided with an extension 36 at the rear end thereof. The extension 36 is provided with a key 37 which is adapted to slip into a broached key-way 38 provided in a drive cylinder 39 which is rotatably mounted in the hub 32 by a ball bearing arrangement 40.

The spindle 35 shown is of twisted flat bar stock and is of double lead, i.e., it dispenses a merchandise package 21 with each 180° of rotation.

In addition to fixing the module 20 to the panel 19, the nut 34 also holds a channel-shaped support bracket 41 firmly against the front face of the support panel 19. The bracket 41 pivotally mounts a switching bar 42 having a pass along switch engaging leg 43 (FIG. 8) and a merchandise sensing lever or feeler 44. The function of the switching bar 42 will be more fully explained under the heading "Sold Out Switch System."

The drive cylinder 39 is provided with a cam area indicated generally by 45 including at least one cam notch 46 (FIG. 7). The cylinder 39 also is provided with cross-shaped slots 47 on the rearward end. The hub 32 is provided with a notch 48 aligned with the cam area 45 and specifically with the cylinder cam notch 46.

Mounted on a reduced portion 49 of the hub 32 is a solenoid coil 50. A solenoid plunger 51 provided with a driving tang 52 is mounted within the hub 32 and is axially aligned with the drive cylinder 39. A hexagonal plunger extension 53 (FIG. 7) is fixed to the rear portion of the solenoid plunger 51. The secondary drive sprocket 29 is rotatably fitted to the rear end of the hub 32 and is provided with a hexagonal opening 54 adapted to drivingly engage the hexagonal plunger extension 53. The solenoid plunger 51 is urged axially outwardly by a spring 55 which is compressed between the outer surface of the sprocket 29 and a washer 56 fastened by means of a screw 57 to the outer end of the plunger extension 53. The plunger 51 is retained in the hub 32 by shoulder 58.

The hub 32 is of non-magnetic material, preferably aluminum or brass, and the solenoid plunger 51 and extension 53 are of steel.

Each of the modules 20 also include a cam spring and roller support post 59 mounted on the base 31, a cam follower 61 and a cam spring 62 urging the cam follower 61 into the hub slot 48. The cam follower 61 is pivoted at one end 63 to the base 31 and is adapted to operate a double pole, double throw switch 64 to control various functions as will be more fully explained hereinafter.

In the module illustrated, an idler roller 60 is mounted on the post 59 and bears on the drive chain 28 to urge the chain 28 into engagement with the sprocket 29. On other modules, the idler roller 60 would have to be located in another position to serve this function and maintain the foregoing relation to the chain 28 and sprocket 29.

The modules 20 also include a sold out switch assembly 65 (FIGS. 5 and 8) which is actuated by a plunger 66 mounted in the module base 31. The plunger 66 passes through the support panel 19 in a guide tube 66a and is engaged by the bracket switching leg 43. As will be explained more fully hereinafter, when the spindle 35 is empty, the switching bar 42 falls to the position indicated by the broken line of FIG. 8 and the plunger 66 actuates the sold out switch 65 which prevents the solenoid coil 50 from being activated.

The spindles 35 may be single or double lead. The spindles 35 shown are double lead and thus dispense a merchandise package with each 180 degrees of rotation. The cylinders 39 then have two opposed cam slots 46. If single lead spindles are used, only one cam slot 46 is needed in the cylinder 39.

The spindles may be of twisted flat bar stock (double lead), wound wire stock as in coil spring, or single lead hobbed or machined auger like helix 35a (FIG. 22). The spindles may have pitches of various sizes depending on the thickness of the merchandise packages. The spindles are on the order of 1" or less in diameter.

*Sold out switch system*

As may be seen in FIG. 1, the three centrally located vertical columns of merchandise packages 21 are each provided with only a single selector 18 for four vend modules 20. It is contemplated that each of the vertically aligned module spindles 35 in the middle columns will have similar merchandise packages 21. The merchandise will be of the type that is popular and rapidly sold. When the lowermost of any of the middle module spindles 35 is empty, a sold out or pass along switch system will automatically actuate the next vertically adjacent module 20.

In FIG. 10, the vend modules A and A' indicate diagrammatically the operation of the sold out switch system and FIG. 8 shows the corresponding mechanical structure. As may be seen in FIG. 8, the channel or bracket 41 which is secured to the front face of the support panel 19 pivotally carries the switching bar 42, the lever portion 44 of which rides on the top of the merchandise packages 21. The bar 42 is provided with a switching leg or pusher 43 which is engaged with a plunger or push rod 66 which passes through the support panel 19 to a switch 65. When the last package of merchandise 21 has been dispensed, the lever 44 is pivoted downwardly (to the position indicated by the broken lines of FIG. 8) and the pusher 43 moves the push rod 65 to the rear to open the contacts 70 and 71 and to close the contacts 71 and 72, thus establishing a circuit to the next vend module A'. When the selector switch 18 for the module A is next pushed, it will instead actuate the module A' in a manner hereinafter described.

The vend modules 20 which are located around the side margins of the panel 19 also include a sold out switch mechanism which is actuated by the bar 42 and the plunger 66; but the second contact 72 is eliminated, and the action of the bar 42 and the plunger 66 merely opens the contacts 70 and 71 and breaks the circuit to the solenoid coil 50. Therefore, when the patron pushes one of the individual merchandise vend module buttons and that particular module is sold out, nothing happens since there is no circuit to the solenoid coil 50. The patron may then select another type of merchandise or may get his coin back by pushing a coin return button (not shown, but conventional in vending machines).

*Circuitry and operation of embodiment of FIGS. 1–9*

The circuit diagram of FIG. 10 shows the circuitry for four modules 20, and additional modules would be diagrammed accordingly. Thus, FIG. 10 is only a representation of the electrical circuitry for the machines illustrated. The letters A, A', B and C indicate the vend modules 20 hereinbefore described. The A and A' modules are representative of vertically aligned middle modules and the B and C modules are representative of side margin modules.

In the circuit, line 1 is common to all of the components, that is, the selector solenoid coils 50, the vend motor 26, the vend relay coil 74a, and the coin blocking relay 75.

Upon insertion of a coin in the coin slot 23, the coin switch 73 will be momentarily closed, thus closing a circuit from line 2 through the contacts 79 and 80 of each module A, A', B and C, and through the coin switch 73 to the vend relay coil 74a. This will energize the vend relay 74, thus closing the contacts 82 and 83 to retain the relay 74 in closed position. As the contacts 83 and 84 are opened, the coin blocking relay 75 is de-energized and acts to block further deposit of coins until a vend is completed. The coin blocking relay 75 is a standard item of equipment in vending machines and forms no particular part of this invention. Closing of the vend relay 74 also causes the contacts 85 and 86 to close to energize the common vend motor 26 and also closes contacts 87 and 88 to energize the selector circuit indicated generally by 89.

As conditions now stand, the vend relay 74 is locked in, the vend motor 26 is running and driving the sprockets 29 on each of the vending modules 20, while the coin blocking relay 75 is de-energized and power is made available to the selector.

The machine 10 is now in condition for the patron to select the type of merchandise which he wishes. To do so, the patron pushes a selector button 18, thus completing a circuit to the chosen selector solenoid 50. The circuit thus established will be from line 2 through the vend relay contacts 86, 85, 88 and 87, the selector switch 18, the contacts 71 and 70, the selector solenoid 50 and to line 1.

When a selector solenoid 50 is energized, a strong magnetic field will be established between the back face of the spindle drive cylinder 39 and the solenoid plunger 51 (which is now being rotated by the motor 26, chain 28, and sprocket 29 arrangement). Since the cylinder 39 is axially restrained by the ball bearing assembly or the engagement of the cam follower 61 in the cylinder cam slot 46, while the solenoid plunger 51 is slidably engaged with the sprocket 29, the solenoid plunger 51 will be drawn into rotational engagement with the cylinder 39 by the magnetic flux. The plunger tang 52 will engage the cylinder slot 47. Upon engagement of the cylinder 39 with the plunger 51, the cylinder 39 (including the cam area 45) and the spindle 35 will be driven in a direction to deliver one package of merchandise 21 and to actuate the cam follower 61 and switch assembly 64.

During this operation, the following sequence occurs: the selector switch 18 of the module which has been selected (as an example, module "C" of FIG. 10 has been selected and the closed switch 18 is indicated by the broken lines) activates the solenoid coil 50 and this actuates the drive cylinder cam 45 which drives the cam follower 61 to open the contacts 76 and 77 and close the contacts 77 and 78, thereby establishing a circuit from line 2 (via normally closed contacts 76 and 77 of each preceding module) through the vend motor 26 to maintain the vend motor 26 energized throughout the cam cycle.

Simultaneously, the cam 45 and cam follower 61 opens the contacts 80 and 79 to de-energize the vend relay 74, and closes the contacts 79 and 81 to establish a circuit from line 2 to the selector solenoid 50, thereby maintaining the solenoid 50 energized throughout the cam cycle. (This is indicated by the broken line in module "C" of FIG. 10.) When the vend relay 74 drops out, the contacts 87 and 88 break and power to the selector 89 is interrupted (solid lines in FIG. 10), to aid in making the machine cheat proof.

Upon completion of one cam cycle, the cam follower 61 falls back into the cylinder slot 46, allowing the switch assembly 64 to return to normal (solid lines in FIG. 10), thus breaking the contacts 78 and 77 and deactivating the vend motor 26. Contacts 81 and 79 are broken to interrupt the solenoid circuit, and contacts 79 and 80 close, thus establishing a circuit from line 2 to the coin blocking relay 75 through contacts 83 and 84 of the vend relay 74, thus reestablishing the coin mechanism in a condition to receive coins.

The sold out switch arrangement is illustrated by modules A and A' of FIG. 10. When the module A is sold out, the push rod 66 breaks the contacts 70 and 71 and establishes contacts 71 and 72 (broken lines of FIG. 10). Thus, when the selector switch 18 for the module A is pushed, the solenoid coil 50 is bypassed and the circuit established includes the solenoid coil 50 of module A' and is made through contacts 71 and 72.

As mentioned, the modules B and C also include a sold out feature, but the push rod 66 in these instances merely opens the contacts 70 and 71 and pushing the selector switch 18 has on effect.

*Package tab constructions*

Various forms of merchandise packages may be utilized with this invention. Various constructions of the tab openings also are contemplated. FIGS. 14–21 show several suitable constructions.

FIGS. 14 and 15 show a preferred construction which comprises a merchandise package 21 having a package tab 100 provided with a rectangular opening 101 and an inverted delta-shaped flap 102 at the bottom thereof. The top margin 103 of the flap 102 defines the bottom margin of the rectangular opening 101. A diagonal cut 104 forms one edge of the triangular member 102 and a diagonal score line 105 defines the other edge of the flap 102. The cut 104 and the score 105 originate at the opposite bottom corners of the rectangular opening 101 and converge until they intersect. In loading the spindle 35, the flap 102 is bent open (FIG. 15) as the package 21 is slipped onto the spindle 35, and the flap 102 returns to its closed position, when allowed to come to rest on one of the horizontal lands of the spindle. The rectangular opening 101 grips the flat of the spindle 35 to define a positive drive for the package 21.

Another modification is shown in FIG. 16 and comprises a package tab 106 having a rectangular opening 107 and a rectangular flap 108 defined by a free top margin 109, vertical cuts 110 at the side edges, and a horizontal fold line 111 connecting the bottoms of the cuts 110 and being parallel to the top margin 109. The tab 108 will be bent out of the plane of the tab 106 when the packages are loaded on the spindle 35, and then returned to an upright position to provide a positive drive for dispensing the package 21.

Another modification is shown in FIG. 17 and comprises a package tab 112 provided with a horizontal rectangular slot 113. This variation is very practical when the spindles 35 are pre-loaded with merchandise packages 21 at the factory or the distributors place of business, and are exchanged for an existing spindle at the machine.

FIG. 18 shows a tab 114 having an inverted delta-shaped opening 115. In this modification, the spindle 35 in effect rides on the flat top edge 116 of the opening, so that the package 21 is positively driven along the length of the screw spindle 35.

Another modification is shown in FIGS. 19 and 20 and comprises a package flap 117 defined by a front member 118 provided with an arcuate opening 119 and the top and bottom edges 120 and 121 of the front member 118 are folded toward each other at the rear of the front member so that they cover part of the arcuate opening 119 from the rear. Thus, in effect a slot-like space defined by the sides of the opening 119 and the end margins 120 and 121 of the top and bottom flaps is provided.

Another modification is shown in FIG. 21 and comprises a round opening 122 in a package tab 123. This modification while not providing a positive drive for all types of packages is nevertheless useful for certain merchandise when used with a coil-like helical spindle 35d shown in FIG. 22.

*Bread vending machine*

FIGS. 11 and 12 show another modification of the vending machine which is suitable for vending large, heavy packages such as the illustrated loaves of bread. This construction is similar to that hereinbefore described except that the helix or screw spindle 35a is rotatably journaled at both ends. The different spindles 35a are suitable for use with different brands of bread.

The spindle 35a is provided with a cylindrical bar 35b on the dispensing end. The bar 35b is suitably supported and journaled in a housing 35c. The other end of the helix 35a is adapted to be rotatably engaged as hereinbefore described for FIGS. 1–10 with the dispensing mechanism. The bread packages 21a are dispensed from the bar 35b and pass down the side of the casing to a dispensing opening 22a.

A novel overwrap 125 for the individual loaves of bread is shown in FIG. 12 and comprises a package support or enclosure portion 126, which may be a complete overwrap as shown, and an upstanding tab 127 which is provided with an open-ended slot 128 connected to an inverted delta-shaped opening 129. As the bread packages 21a are rotated along the spindle 35a, the shoulders 130 on the delta-shaped opening 129 retain the bread package 21a on the spindle 35a. However, when the bread package 21a reaches the end of the screw portion of the spindle 35a, it rides onto the bar 35b, and the bar 35b passes through the slot 128 to dispense the bread package 21a.

*Preferred modified vending machine of FIGS. 23–27*

FIGS. 23–27 show a preferred modification of the vending machine embodying the inventive concept hereinbefore described. The modification embodies the basic concept of a replaceable vend module with a plug-in circuit arrangement, and further improves upon this concept by incorporating individual drive motors into each module, so that the modules are self-contained and can be replaced merely by unplugging the module from the basic electrical circuit and removing a lock nut from the support panel. In addition, the preferred modification incorporates individual selector means for each dispensing module and preferably includes security means.

The modified vendor 200 incorporates a casing 201 having mounted therein a forwardly inclined support panel 202 provided with a plurality of individual vend delivery modules 203. Incorporated into the basic electrical system for the vendor 200 is a conventional conduit and plug 204 which is plugged into a normal 115 volt voltage source and a step-down transformer 205 which converts the voltage delivered to the vend modules 203 to 24 volts for safety purposes. The voltage from the transformer 205 goes to a 24 volt A.C. holding or vend relay 206 which is energized when a coin is dropped into the coin chute 207. As will be explained in more detail in connection with the circuit diagram (FIG. 30), the vend relay provides power to the merchandise selector switches 208 mounted on the face of the machine 200.

The coin insert 207 leads to a standard slug rejector and coin switch or other coin crediting mechanism for energizing the vend relay 206, and thence to a coin box or a coin return 207a.

Connected to the vend relay 206 are the selector switches 258 (activated by the selector buttons 208 shown in FIG. 23), and the various receptacles 209 for the plug-in vend modules 203. FIG. 24, for purposes of illustration, shows only a few of the vend modules 203 and only a portion of these are shown as connected up to the vend relay 206. In an actual machine, all modules 203 are similarly connected. The circuitry will be considered in more detail in connection with FIG. 30.

Another advantage of the vendor 200 is the provision of a locked storage compartment 210 in the base of the casing 201 for storage of merchandise.

*Individual vend modules*

Each of the individual vend delivery modules 203 comprises a sealed gear casing 211 which fits against the rear side of the support panel 202 and a hollow hub 212 fastened to the casing 211 and fitted through an opening 213 in the support panel 202 and externally threaded at its outermost end. A nut 214 fits onto the threaded end of the hub 212 and in conjunction with the bearing of the gear casing 211 retains the vend module 203 on the support panel 202. A gear train 215 is positioned within the the gear housing 211 and rotates a delivery rod receptacle 216 rotatably journaled in the hub 212. A motor 217 is mounted on the gear casing 211 and when activated, engages a rotor 218 (by means of solenoid action of the rotor 218) with the gear train 215 to rotate the delivery rod receptacle 216 one revolution. The delivery receptacle 216 is provided with a cam member 219 on one end which operates a spring loaded cam follower 220 which is pivoted at one end 221 to the gear housing 211 and is urged downwardly by a spring 222 fastened at its other end. A plug-in switch arrangement 223 is positioned on the casing 211 at the side of the motor 217 and is aligned with a projecting finger 224 on the cam follower 220. Lead extensions 225 project beneath the switch member 223 and connect with receptacles 226 (FIG. 26) to plug into the wiring circuit for the vendor 200.

The motor rotor 218 moves into the field of the motor 217 when the motor 217 is energized. A gear on the leading end of the rotor 218 engages the gear train 215 to drive the rod receptacle 216 an appropriate amount (usually one revolution). When the motor 217 is de-energized, as will be explained in more detail hereinafter, the rotor 218 is urged outwardly by a spring (not shown) out of the motor field and out of engagement with the gear train 215 so that movement of the delivery rod receptacle 216 is stopped.

The switch arrangement 223 operates such that when the appropriate selector button 208 on the vendor casing 201 is actuated, the motor 217 for the vend module 203 selected is energized, and the rotor 218 is moved into engagement with the gear train 215 to rotate the delivery member 216. As the member 216 rotates, the cam 219 also rotates to move the cam follower 220 upwardly so that the cam follower finger 224 engages the switch arm 227 to break the circuit from the vend relay 206 after engaging a holding circuit. After the cam 219 has rotated a full revolution, the cam finger 224 drops downwardly and the holding circuit is broken, deenergizing the motor 217. The switching arrangement is more fully shown and described in the circuit diagram of FIG. 30.

The pressure of the cam follower 220 on the cam 219 also standardizes stopping position of the delivery rod receptacle 216 so that the at rest position of the delivery rod 229 is predetermined. As will be explained hereinafter, this minimizes the possibility that shaking of the cabinet will cause merchandise to drop off the end of the delivery rod 229.

A sold out switch activator 228 extends through the support panel 202 adjacent to the lock nut 214, and when engaged, breaks the circuit from the relay 206 to prevent activation of the motor 217 when the appropriate selector button 208 is engaged. Depending on the wiring, this can merely disconnect the appropriate selector switch 258 from the circuit, or actually pass along the selection to another module.

A delivery rod 229 in the shape of a helix is secured to the delivery receptacle 216 by means of a plug 230 on one end engaged in a socket 231 in the end of receptacle 216 that extends through the panel 202. The rod 229 has an end 232 which is so positioned with respect to the cam 219 that the rod end 232 is in three o'clock position when the rod 229 is at rest, to positively retain the merchandise packages 233 on the rod and prevent their being shaken off the end 232. A positioning means 234, such as a rib and slot or flat end pin, positions the rod 229 in the socket 231 such that the rod end 232 and the cam 219 are properly located with respect to one another.

A security bar and sold out switch activator 235 is mounted on the face of the support panel 202 and comprises a U-shaped bracket 236 having a first opening for the hub 212 and a second opening for the sold out switch 228. The bracket 236 fits behind the lock nut 214 and is retained on the face of the panel 202 by the lock nut 214.

A security bar 237 is pivotally mounted in the arms of the U-shaped bracket 236 at 238, and is adapted to ride on the top of the mechandise packages 233 mounted on the screw vendor 229. A weighted downturned indicia carrying member 239 is positioned on the end of the bar 237 and rests on the most outboard package 233 to keep the package 233 from being shaken off the end 232 of the screw delivery member 229. The depending flange 239 is provided with indicia 239a (FIG. 23) on its outer face corresponding to the numbered switches 208 on the face of the casing 201 to indicate the proper switch for the particular vend module (FIG. 23). Thus, if the buyer wants the merchandise from rod No. 10, he selects the button No. 10.

A depending arm 240 moves with the security bar 237 and is aligned with the sold out switch 228, so that when the delivery rod 229 is devoid of merchandise packages 233, the member 237 drops over the end of the delivery rod 229 and the arm 240 engages the sold out switch 228 to prevent the motor 217 for this vend module 203 from being activated thereafter, even though its selector button 208 is pushed.

*Circuitry and operation of embodiment of FIGS. 23–30*

The circuit diagram of FIG. 30 shows the circuitry for the twenty modules 203, and additional modules would be diagrammed accordingly.

In the circuit, line 2 is common to all of the components, that is, the left side of the motors 217 at the contact 251, the vend relay coil 206a, and the coin blocking relay 252.

The illustration of a Jones Plug in FIG. 30 shows the connections through the male and female parts of the plug diagrammatically only. While the Jones Plug is convenient method of connecting the coin mechanism to the voltage source, the connections could equally be made in any well known manner. For example, line 1 is connected to the switch 256 and to either the male or female part of the Jones Plug at the No. 1 connection. The switch 250 is connected to the other plug part also at the No. 1 connection. When the parts of the Jones Plug are in operative relationship, line 1 is connected to the switch 250. The other connections through the Jones Plug are made similarly.

Upon insertion of a coin in the coin slot 207, the coin switch 250 is momentarily closed, thus closing a circuit from line 1 through the coin swith 250 to the vend relay coil 206a. This energizes the vend relay 206, thus closing the contacts 253 and 254 to retain the relay 206 in closed position, and open the contacts 253 and 255 to deenergize the coil blocking relay 252 and block further deposit of coins until a vend is completed. The coin blocking relay 252 is a standard item of equipment in vending machines and forms no particular part of this invention. Closing of the vend relay 206 also causes the contacts 256 and 257 to close to energize the selector switch circuit indicated generally by 258.

At this point, the vend relay 206 is locked in, the coin blocking relay 252 is deenergized, and power is made available to the selector switches 258.

The machine 200 is now in condition for the patron to select the type of merchandise which he wishes. To do so, the patron pushes a selector button 208, thus completing a circuit from line 1 to the right side of the motor 217 through contacts 259 and 260 of the sold out switch 261 and contact 262. The circuit thus established will be from line 1 through the vend relay contacts 256 and 257, the selector switch 258, the contacts 259 and 260 and the sold out switch 261, the contact 262, the motor 217, and the contact 251 to line 1.

When a motor 217 is energized, the rotor 218 is rotated and pulled into the field of the motor 217 by a solenoid action. The rotating rotor 218, through the gear train 215 rotates the delivery rod receptacle 216 and the delivery rod 229 one revolution to drop one merchandise package 233 off the end 232 of the delivery rod 229.

As the receptacle 216 rotates, the cam 219 also rotates, driving the cam follower 220 so that the finger 224 moves the spring contact 263 into engagement with the contact 264 and thereafter moves out of engagement with the spring contact 265. This action connects line 1 to the right side of the motor 217 through contacts 263, 264 and 262 in the motor unit selected and through the contacts 263 and 265 of all lower numbered motor units. Disengaging the contacts 263 and 265 interrupts the circuit to all higher numbered motor units and therefore interrupts the circuit from line 1 to the relay 206 through contact 253. Interruption of the circuit through contacts 253 and 254 to one side of the relay coil 206a causes the relay 206 to be deactivated so that the contacts 253 and 254 open and also the contacts 256 and 257 open. This interrupts the line 1 circuit to the lower numbered selector switches 258. Since the pushing of the selector switch 258 (as indicated by the broken lines in FIG. 30) has interrupted the circuit from line 1 to the higher numbered selector switches 258, this safeguards against more than one merchandise package being dispensed for each coin inserted.

The engagement of the contacts 263 and 264 carries line 1 to the right side of the motor 217 and compensates for interruption of circuit through the selector switch 258 by the deenergizing of the relay 206.

The contact 265 is springlike and moves with the contact 263 until the contact 263 is engaged with the contact 264 to avoid deenergizing the motor 217 prematurely.

After a complete revolution of the cam 219, the spring contact 263 breaks engagement with the contact 264 to break the circuit from line 1 to the motor 217 and deactivate the motor 217.

The foregoing returns all of the switches to their initial at rest position and the machine is in condition to receive another coin.

The sold out switch arrangement also is illustrated in FIG. 30. When the delivery rod 229 is empty, the bar 237 drops over the rod 229 and the finger 240 moves the push rod 228 inwardly, breaking the contacts 259 and 260 (broken lines of FIG. 30). Thus, when the selector switch 258 for this module is pushed, nothing happens since line 1 is not connected to the motor 217. When this selector switch 258 is released, another selector switch 258 may be engaged to deliver a merchandise package as hereinbefore explained.

The device may also be wired so that the sold out switch will pass along the selection to another module motor 217, if desired.

The unused switch 266 may be used to operate an escrow service device to return coins to the patron should he select a sold out module. The switch 266 also can be used to turn on a "sold-out" light. One side of these devices would be connected to line 2.

*Modified delivery rods*

The delivery rod 229 with the end 232 at the three o'clock position and the weighted security bar 237 shown in FIGS. 25 and 27 may be used individually as security measures, but it is preferred to use them in combination.

Another modification of the security means is shown in FIG. 28 and comprises a helix-shaped delivery rod 241 having a plug member 242 at one end with the plug 242 being provided with a receptacle 243 aligned with the center of the helix formed by the rod 241. A thin security rod 244 is adapted to be threaded through the center opening of the helix and positioned in the receptacle 243, so that the merchandise packages 233 ride beneath the security 244 and are locked between it and the helix 241.

FIG. 29 shows a further modification of this arrangement in which the outboard end 245 of the security rod 244 is mounted in an opposing panel 246 to provide outboard support for the delivery rod 244. The sold out bar 237 has a loop 247 on its outboard end to fit over the security rod 244 to activate the sold out switch when the helix 229 is empty. The security rod 244 is not placed in the plug 242, to facilitate refilling of the spindle 229.

This invention is intended to cover all changes and modifications of the examples of the invention herein chosen for purposes of the disclosure, which do not constitute departures from the spirit and scope of the invention.

What is claimed is:

1. A vending machine comprising a case, a support panel, a plurality of helical dispensing spindles adapted to store and dispense merchandise packages mounted on the panel, drive means for rotating said spindles, means for selectively connecting said spindles with said drive means, the spindles being inclined downwardly toward the front of the case and the leading ends of the uppermost spindles project ahead of the next adjacent lower spindle end.

2. The structure of claim 1 including a sold out switch means for preventing energization of the connecting means, said sold out switch means being operatively associated with the merchandise packages, the spindle and the connecting means, and preventing energization of the connecting means when the spindle is emptied of merchandise packages.

3. A vending machine comprising a case, a support panel, a plurality of helical dispensing spindles adapted to store and dispense merchandise packages mounted on the panel, drive means for rotating said spindles, means for selectively connecting said spindles with said drive means, the drive means including sprockets aligned with the spindles and adapted to be selectively engaged therewith, and an endless chain connecting the sprockets and the output shaft of a main drive motor.

4. The structure of claim 3 wherein the connecting means includes a member connected to one end of the spindle, said member being slotted on its other end, a solenoid, means for energizing the solenoid, a solenoid plunger keyed to said sprocket and having a wedge adapted to be drivingly engaged with the slotted member upon energization of the solenoid.

5. The structure of claim 4 wherein the connecting end slotted member is rotatably journaled in the support panel and is provided with a cam slot and an adjacent cam surface intermediate its ends, structure including a cam follower biased toward the connecting member and normally resting in the cam slot, the cam follower riding on the cam surface and activating switch means to maintain the solenoid energized when the solenoid plunger is drivingly engaged with the connecting member.

6. A vending machine comprising, a case, a support panel mounted in the case, a screw shaped rotatable dispensing spindle, a hollow hub having a slot in one wall, a drive cylinder connected to the spindle and rotatably mounted in the hub, said drive cylinder having a slot and adjacent cam surface aligned with the slot in the hub wall, means for removably mounting the hub on the support panel, a solenoid mounted on the hub, a drive sprocket rotatably mounted on the hub and adapted to be driven by a remote drive means, a solenoid plunger reciprocally mounted in the hub in alignment with the drive cylinder, means for drivingly engaging the solenoid plunger with the cylinder, means for drivingly engaging the solenoid plunger with the drive sprocket, switch means for energizing the solenoid, switch means for maintaining the solenoid energized, a cam follower normally residing in the cam slot and movable by the drive cylinder cam surface to actuate the second named switch means through a dispensing cycle, and sold out switch means for preventing energization of the solenoid when the spindle is devoid of merchandise, said sold out switch means including a merchandise sensing portion and a switch portion movable with the sensing portion, the sensing portion being actuated when the spindle is empty and moving the switch portion to interrupt the means for energizing the solenoid.

7. A coin operated machine for vending tab supported merchandise packages comprising a case, a main support panel mounted in the case, a plurality of replaceable vend modules mounted on the panel, a common drive motor for the vend modules, means for energizing the drive motor upon deposit of a coin in the machine, a common endless drive means driven by the drive motor and operatively associated with a driven member on each of the vend modules, rotatable helix shaped spindle means on each of the modules for holding and dispensing the merchandise packages, the spindle means being inserted through openings in the tab portions of the merchandise packages, selector means for temporarily connecting the driven member of the vend module with the spindle means on said module to rotate the spindle means and dispense a merchandise package from its free end, and means for preventing actuation of the spindle means when the spindle means is devoid of merchandise.

8. A coin operated machine for vending tab supported merchandise packages comprising a case, a main support panel mounted in the case, a plurality of replaceable vend modules mounted on the panel, drive motors for the vend modules, means for energizing a drive motor upon deposit of a coin in the machine, a rotatable helix shaped spindle means on each of the modules for holding and dispensing the merchandise packages, the spindle means being inserted through openings in the tab portions of the merchandise packages, and connector means for temporarily connecting the drive motor of the vend module with the spindle means on said module to rotate the spindle means and dispense a merchandise package from its free end.

9. The structure of claim 8 including a security rod positioned in the center of the spindle means.

10. The structure of claim 9 wherein the security rod is anchored at the base of the spindle means.

11. The structure of claim 9 wherein the leading end of the security rod is supported outboard of the delivery end of the spindle means.

12. The structure of claim 8 including a security member pivoted at one end and extending along the top of the merchandise packages on the spindle means and resting on at least the outermost package, and wherein the leading end of the spindle means is positioned at about three o'clock position to prevent merchandise from being shaken off the end of the spindle means by shaking the case.

13. The structure of claim 12 including a downwardly depending flange on the outboard end of the security member having switch indicating indicia thereon.

14. The structure of claim 12 including a depending finger movable with the security member and positioned at its inboard end, a switch member on the module and being movable through the support panel, said finger being aligned with said switch member on the module and engaging and moving said switch member only when the spindle means is devoid of merchandise.

15. The structure of claim 8 wherein the vend delivery modules include a housing positioned against the back of the support panel, a hub extending through the panel, said hub being fastened to the housing, and lock means engageable with the end of the hub and the front of the panel to replaceably secure the module to the panel.

16. The structure of claim 8 including security means engaging the top of at least the outermost package to prevent the package from being shaken off the end of the spindle means by rocking the case.

17. The structure of claim 16 wherein the security means is pivotally mounted at the innermost end of the spindle means, the outer end of the security means being supported by the outermost package, a finger on the innermost end of the security means, a switch aligned with the finger, and means movable through the support panel between the switch and the finger to engage the switch and prevent energization of the drive motor when the spindle means is emptied of merchandise.

18. A replaceable merchandise vending module for a vending machine comprising a helix shaped rotatable dispensing spindle, drive means for the spindle including a gear casing having one surface adapted to be positioned against one side of a support panel for the module, a hollow hub fastened to the casing surface and having threads on its external surface, retainer means threaded on the hub and adapted to be positioned against a second side of the support panel to fasten the gear casing thereto, a delivery rod receptacle journaled in the hub, the delivery rod receptacle having means for retaining and rotating the spindle, a gear train in the gear casing, the delivery rod receptacle being rotatable by the gear train, a motor, a displaceable rotor which when the motor is energized moves into the motor field to engage and activate the gear train, means normally urging the rotor out of the motor field, cam means rotatable with the delivery rod receptacle, cam follower means engaged with the cam means and operated thereby, and switch means operated by the cam follower means to interrupt current to the motor and deenergize the motor.

19. A coin operated machine for vending tab supported merchandise packages comprising a case, a main support panel mounted in the case, a plurality of replaceable vend modules mounted on the panel, drive means for the vend modules, means for selectively energizing said drive means upon deposit of a coin in the machine to operate a vend module, a rotatable helix shaped spindle on each of the modules for holding and dispensing the merchandise packages, the spindle being inserted through openings in the tab portions of the merchandise packages, the spindles being in the shape of twisted flat stock having a reduced portion at the leading end, the tab openings being in the shape of an open ended slot connected to an inverted delta shaped opening, secondary support means opposed to the support panel the leading end of the spindle being rotatably journaled in the secondary support means, connector means for temporarily connecting the drive means with the spindle to rotate the spindle and dispense a merchandise package from its reduced portion adjacent to the end journalled in the secondary support means.

20. A replaceable merchandise vend module for a vending machine comprising a rotatable dispensing spindle, drive means for the spindle including a casing having one surface adapted to be positioned against one side of a support panel for the module, a hollow hub having a leading end projecting forwardly of the casing surface into the support panel, retainer means adapted to be positioned against a second side of the support panel and connected to the hub to removably fasten the module to the support panel, a delivery rod receptacle journalled in the hub, the delivery rod receptacle having means for retaining and rotating the dispensing spindle, drive means on the casing, means for connecting the drive means to the delivery rod receptacle so as to rotate said receptacle through a predetermined arc when the drive means is energized to deliver a unit of merchandise each time said receptacle is so rotated, cam means rotatable with the delivery rod receptacle, cam follower means engaged with the cam means and operated thereby, and switch means operated by the cam follower means to interrupt current to the drive means and de-energize the drive means after a predetermined period of activation.

References Cited by the Examiner

UNITED STATES PATENTS

| | | | |
|---|---|---|---|
| 487,409 | 12/1892 | Moran | 221—75 X |
| 1,185,356 | 5/1916 | Weaver | 221—29 |
| 2,392,511 | 1/1946 | Thompson et al. | 194—10X |
| 2,435,177 | 1/1948 | Connell et al. | 221—97 X |
| 2,562,795 | 7/1951 | Kelly | 221—125 |
| 2,586,351 | 2/1952 | Larimore | 221—129 X |
| 2,708,996 | 5/1955 | Skillman | 194—10 |
| 2,719,651 | 10/1955 | Gabrielsen | 221—14 |
| 2,884,110 | 4/1959 | Krasney | 194—10 |
| 2,885,115 | 5/1959 | Stiller | 186—1 X |
| 2,975,935 | 3/1961 | Hebel | 194—10 X |
| 3,085,711 | 4/1963 | Holstein et al. | 221—75 |
| 3,158,247 | 11/1964 | Gale | 221—9 X |
| 3,174,646 | 3/1965 | Johnson | 221—129 |
| 3,191,737 | 6/1965 | James et al. | 221—110 |

FOREIGN PATENTS 370,836   1/1907   France.

OTHER REFERENCES

German printed application, 1,157,017, 11/1963 (Kl. 43b, 20) (Heupel).

M. HENSON WOOD, JR., *Primary Examiner.*

KENNETH N. LEIMER, ROBERT B. REEVES,
*Examiners.*